J. S. Sturges.
Horse Rake.
Nº 8791    Patented Mar. 9, 1852.
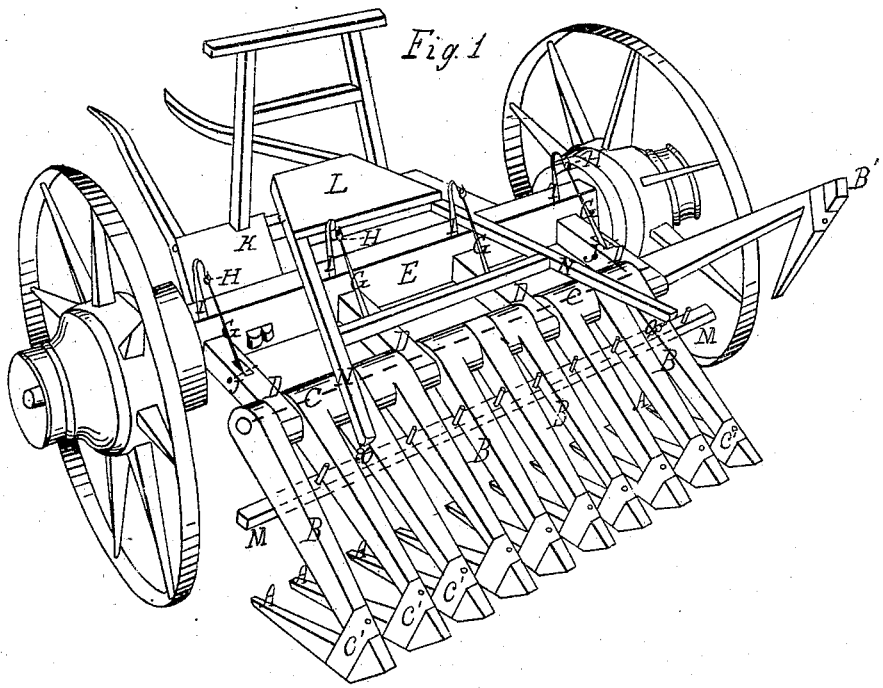
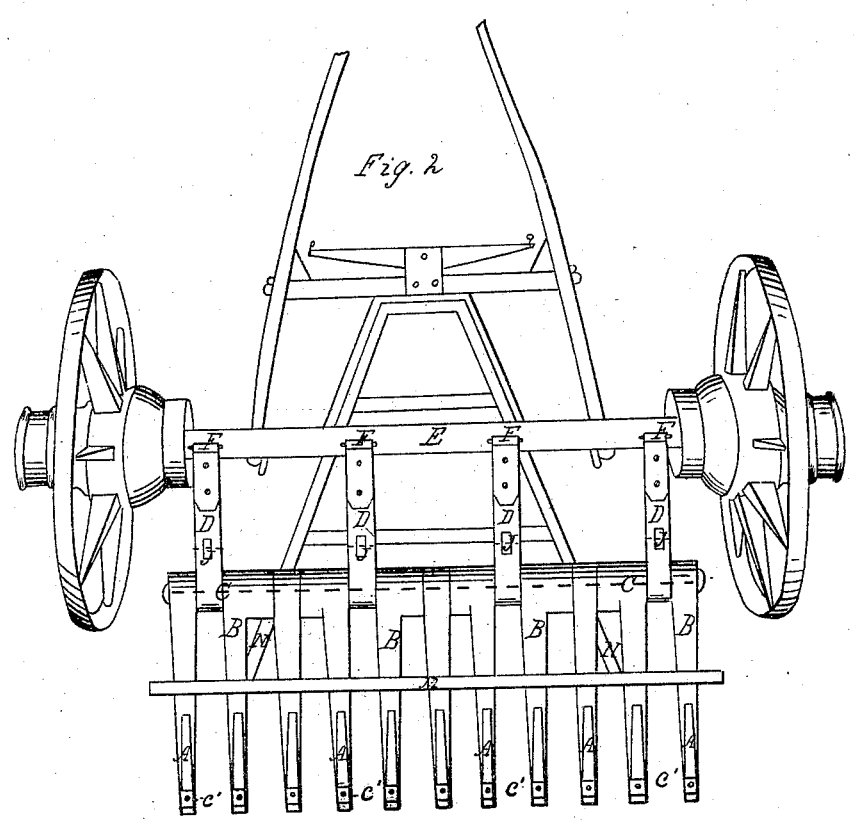

UNITED STATES PATENT OFFICE.

J. S. STURGES, OF LITCHFIELD, OHIO.

IMPROVEMENT IN HAY-RAKES.

Specification forming part of Letters Patent No. 8,791, dated March 9, 1852.

*To all whom it may concern:*

Be it known that I, J. S. STURGES, of Litchfield, in the county of Medina and State of Ohio, have invented new and useful Improvements in the Construction of Horse-Rakes, (I denominate my rake the "Adjustable Horse-Rake;") and I do hereby declare that the following is a full and exact description of the construction and operation of the same, reference being had to the annexed drawings, and to the letters of reference marked thereon.

Like letters refer to like parts in the different views, in which—

Figure 1 is a perspective view, and Fig. 2 a view of the machine inverted.

What I consider as my improvement and essentially different from any other now in use is the manner of adjusting the position of the teeth to the nature of the ground and to the quantity of hay or other grasses to be raked. The want of this adjustability in the horse-rakes now in use has been found to be a serious objection, and the nature of some land forbids their use entirely. These objections I have completely removed by the application of my improvements, which have been practically tested.

My rake is attached to an axle-tree placed upon wheels, as seen in Fig. 1. The teeth A are secured to the head B by the band C', and a bolt or pin passes through the head and tooth, secured at the under side of the band by a nut or heading. In the corner formed by the joining of the head and tooth is placed a stay-block, through which the bolt or pin also passes. The band C' passes around the head and tooth, thereby lapping on each side of the stay-block. By this combination a firm and durable tooth and head is secured, there being no possibility of its breaking, which is often the case with the spring or inserted tooth, and at a time when such delay and expense is most to be avoided. The heads B are suspended on the rod C in such a manner as to act independently of each other, if required. The rod C, to which the heads B are hung, is supported by the arms D, which project out at right angles from the axle E. The rod C passes through the center of the arms near the end. At each end of the rods are washers to retain the teeth and rod in place. The arms D are attached to the axle E by means of the hinge-joints F, Fig. 2, and supported by having the connecting-rods G, Fig. 1, hung at one end, as seen at H, to the standard I, which is bolted to the axle. The other end of the connecting-rod passes into a mortise in the center of the arms, as seen at J, Fig. 1, which forms a joint by a pin passing through the arm and connecting-rod at J. This adjustable arrangement is one important feature of my improvement. Its advantages will be readily perceived from the fact that this implement is much lighter, because the heads of the teeth are much shorter than the usual length, and more available, as the arms allow the teeth to be hung farther from the wheels, whereby they are not liable to be clogged by hay. This arrangement admits also of an easy adjustment, whereby the teeth can be elevated or depressed at pleasure by the pin at J being inserted in the pin-holes at the lower end of the connecting rod and arm. By this adjustability it is rendered applicable to rough or smooth land and the kind and conditions of the grass, which has not been accomplished by any other means.

This rake may be constructed for one or two horses, as may be required. The one which I have described is designed for one horse, and tended by a man or boy, who can stand on the platform K, Fig. 1, and drive the horse and gather hay at the same time with certainty and ease.

By placing the foot on the lever-platform L' teeth are raised to B' and the hay discharged in windrows. This is accomplished by having the rod M, which extends along under the heads B, Fig. 2, connected to the levers N N by means of a rod or chain, as seen at O O, Fig. 1. The levers N N are attached to the axle by a hinge or staple joint, so as to secure an easy action.

Teeth inserted in the head may be used, but not with the same practical advantages as those constructed in the manner described in my rake; and as my tooth can be elevated or depressed, as may be required, the liability to break by the roughness of the land is removed. Other horse-rakes have not this adjustability to prevent breakage.

I disclaim suspending the head so that each tooth acts separately, and the platform L.

What I do claim as my improvement, and desire to secure by Letters Patent, is—

1. The arms projecting from the axle, in combination with the joint F, for the purpose of adjusting the position of the teeth to the surface of rough or smooth land.

2. Hanging the arms to the axle by means of the standard I and connecting-rod, and also raising and lowering the arms, as the teeth may require, by means of the pin and holes in the connecting rod and arms at J.

JAY S. STURGES.

In presence of—
 HIRAM NICKERSON,
 E. L. HAYES.